UNITED STATES PATENT OFFICE.

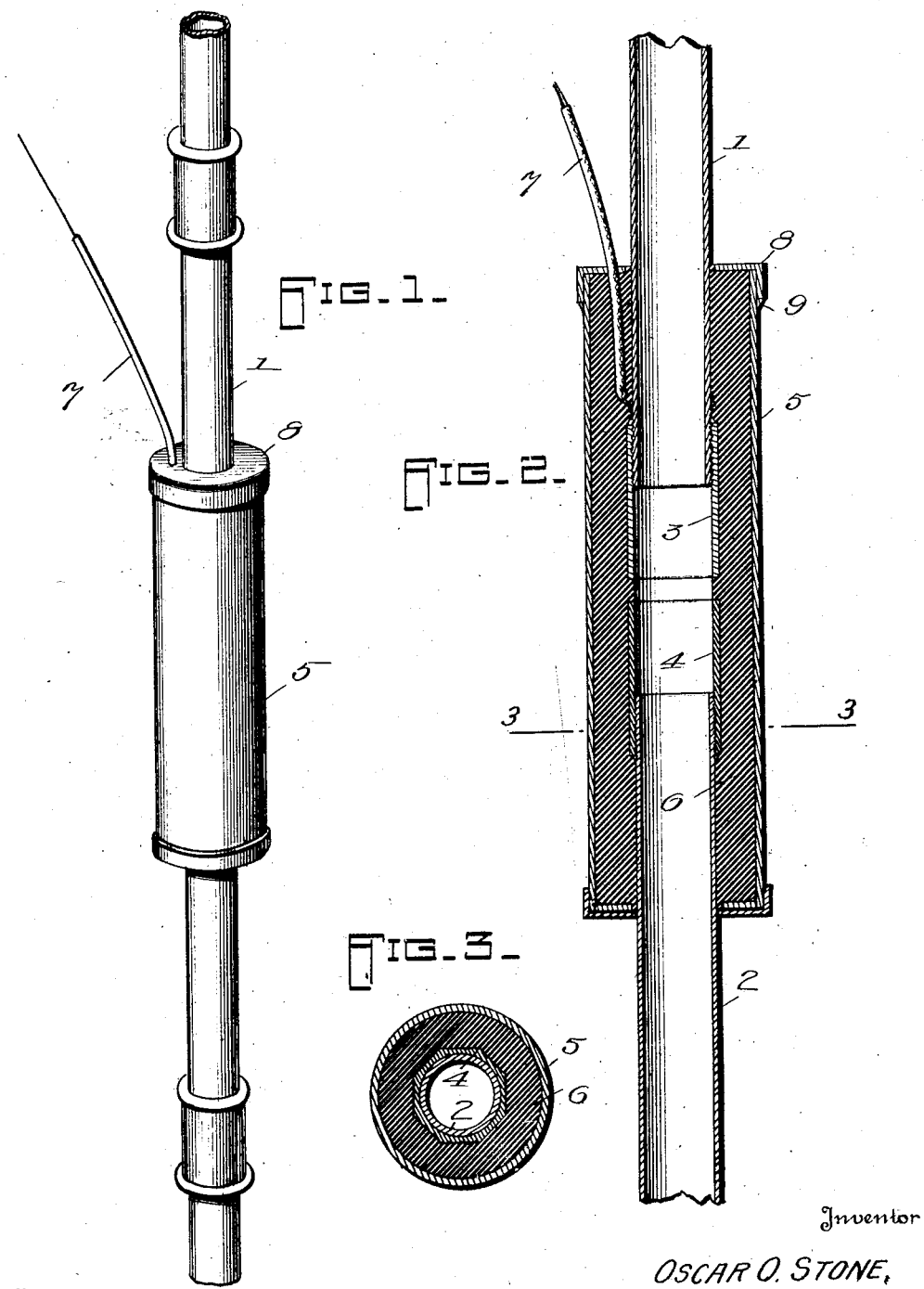

OSCAR OTTO STONE, OF SAN ANTONIO, TEXAS, ASSIGNOR OF ONE-THIRD TO MARK ETNA ROBINSON AND ONE-THIRD TO OLLIE MAY JAY, BOTH OF SAN ANTONIO, TEXAS.

INSULATOR.

1,251,438.  Specification of Letters Patent.  Patented Dec. 25, 1917.

Application filed May 31, 1917. Serial No. 171,889.

*To all whom it may concern:*

Be it known that I, OSCAR OTTO STONE, a citizen of the United States, and a resident of San Antonio, in the county of Bexar and State of Texas, have invented a new and useful Improvement in Insulators, of which the following is a specification.

My invention is an improvement in insulators and has for its object to provide an insulator for use in connection with water pipes and the like, for preventing the passage of electric currents, wherein the pipe is divided, and insulated at the point of division, means being provided at the insulation for conducting the electricity away in order that it may be utilized.

In the drawings:—

Figure 1 is a perspective view of the insulator,

Fig. 2 is a longitudinal section,

Fig. 3 is a section on the line 3—3 of Fig. 2.

In the present embodiment of the invention each of the pipe sections 1 and 2 has at its meeting end a union 3 and 4 respectively, the said unions having their outer surfaces of polygonal form, octagonal in the present instance. The unions are threaded onto the pipe sections, and at their adjacent ends they are spaced apart as shown in Fig. 2. A cylindrical casing 5 having twice the circumference of the pipes is placed over the pipe sections at their meeting ends, the said cylindrical casing having both ends open as shown.

In order that the electricity which flows along the pipe section 1 may be conveyed away from the pipe, a copper wire 7 is wrapped about the pipe section at the union, the wire being connected with the pipe section 1 in the present instance. This wire is insulated except where it is wrapped about the pipe, and the free end of the wire is passed out through the adjacent open end of the casing. An insulating composition indicated at 6 in a plastic state is now inserted in the casing, completely filling the same, and caps 8 are placed on the open ends of the casing, the said caps having central openings through which the pipes extend and one the caps has an eccentric opening through which the wire 7 passes.

Before placing the casing 5, the joint between each union and the pipe section is soldered. The casing 5 is a pipe section of suitable size, and the preferable formula for the composition is as follows:—

One part beeswax,
One part rock dust,
One part plaster of Paris,
One part steel dust.

The composition is prepared in a vessel by heat, the ingredients being stirred together and cooked to about the thickness of thick paint.

The preferable manner of placing the plastic material is to dip the ends of the pipes in the plastic, dipping and cooling until the ends are of the desired thickness. They are then placed in the casing which may be filled from both ends. By this procedure the open ends of the pipe sections may be kept free from the plastic material. The wire 7 is run to a suitable switch, and from the switch the current may be distributed to wherever desired. There is no connection between the pipe sections nor the unions, and it will be noticed that the openings in the caps 8 are large enough so that the plastic insulating material may extend between the caps and the pipe sections. The caps are soldered on the casing, as indicated at 9, and the joint completed is as strong or stronger than were the pipe sections directly connected.

The insulation provides a positive bar against the further passage of electrical currents. The current cannot pass the insulation through wet ground, for instance, to the other pipe section because it will follow the path of least resistance, namely, the wire 7.

I claim:—

1. An insulator of the character specified comprising in combination with the pipe ends, each having at its end a union, a conductor engaging one of the sections at the union, said conductor being insulated where it does not contact with the pipe, a cylindrical casing encircling the pipe sections at their adjacent ends, the said ends being spaced apart, and the casing being filled with a plastic insulating material capable of hardening, said material filling the casing, the conductor being embedded in the material and extending beyond the end of the casing, and caps closing the ends of the casing, said caps having openings for the pipe sections of greater diameter than the sections to permit the insulating material to extend between the pipe sections and the edges of the said openings.

2. An insulator of the character specified comprising in combination with the pipe ends, a conductor engaging one of the sections at the union, said conductor being insulated where it does not contact with the pipe, a cylindrical casing encircling the pipe sections at their adjacent ends, the said ends being spaced apart, and the casing being filled with insulating material capable of hardening, said material filling the casing, the conductor being embedded in the material and extending beyond the end of the casing, and caps closing the ends of the casing, said caps having openings for the pipe sections of greater diameter than the sections to permit the insulating material to extend between the pipe sections and the edges of the said openings.

OSCAR OTTO STONE.

Witnesses:
PAUL R. EHRLICH,
CHARLES MITCHELL.

Copies of this patent may be obtained for five cents each, by addressing the "Commissioner of Patents, Washington, D. C."